Oct. 25, 1955 E. F. WEBB ET AL Re. 24,081

PLASTIC FABRIC FILTER

Original Filed Sept. 30, 1949

INVENTORS.
Edmond F. Webb.
Andre M. Hansen.
BY
Harness and Harris
ATTORNEYS.

United States Patent Office

Re. 24,081
Reissued Oct. 25, 1955

24,081

PLASTIC FABRIC FILTER

Edmond F. Webb, Franklin Village, and Andre M. Hansen, Detroit, Mich., assignors to Chrysler Corporation, Highland Park, Mich., a corporation of Delaware Original No. 2,711,828, dated June 28, 1955, Serial No. 118,872, September 30, 1949. Application for reissue August 18, 1955, Serial No. 529,373

2 Claims. (Cl. 210—169)

Matter enclosed in heavy brackets [ ] appears in the original patent but forms no part of this reissue specification; matter printed in italics indicates the additions made by reissue.

Our invention relates to filters and to the method of making the same.

More particularly our invention relates to an improved type of liquid filter especially adapted for filtering the gasoline in a motor vehicle fuel tank.

A principal object of our invention is to provide an improved filter for substantially removing all foreign matter from liquid passing through the filter.

Another object of our invention is to provide a new and novel type of filter which is particularly adapted to separate gasoline from a mixture of gasoline and water.

A further object of our invention is to provide an improved filter which may have its porosity conveniently and accurately predetermined in accordance with the rate of filtering desired and size of particles to be separated from a fluid.

Another object of our invention is to provide an improved filter which is capable of a self-cleaning action during its normal operation.

Still a further object of our invention is to provide a new and novel method of constructing our improved filter.

Another object of our invention is to provide a plurality of layers of resinous fabric material in a filter of this kind which are securely held together with the warp and woof of respective layers in a selected orientation by spaced integrally fused bonds of the material of the fabric.

Other objects and advantages will become more apparent from the following description of one embodiment of our invention, reference being had to the accompanying drawings in which.

Figure 1:
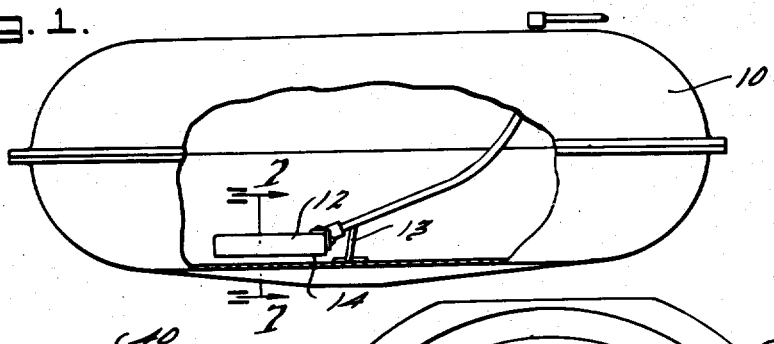
Fig. 1 is a side elevational view of a motor vehicle fuel tank having a portion broken away to more clearly show the invention.
Figure 7:
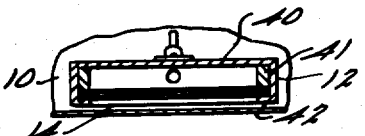
Fig. 7 is a sectional view taken on the line 7—7 of Fig. 1.

In the drawings there is shown a conventional fuel tank 10 which is generally mounted at the rear end of the motor vehicle but is shown unmounted in the drawings for the purpose of simplicity. The fuel tank 10 is provided with an outlet tube 11 for conveying the fluid fuel from the tank under the action of a conventional vehicle fuel pump. The outlet tube 11 is provided at its innermost end with a filter holder or casing 12 and is supported by a small bracket 13 mounted on the floor of the tank. The filter casing 12 comprises an inverted sheet metal cup 40 having a sleeve 41 adjacent the inner surface of its peripheral wall. Disposed over the open end of the casing 12 is a filter member, generally designated by the numeral 14, which is seated upon the outer end of the sleeve 41. The marginal side wall portions 42 of the casing 12 are crimped over the perimeter of the filter member so as to sealingly clamp the edge portions of the filter member between the sleeve 41 and the edge portions 42 of the casing.

Figure 2:
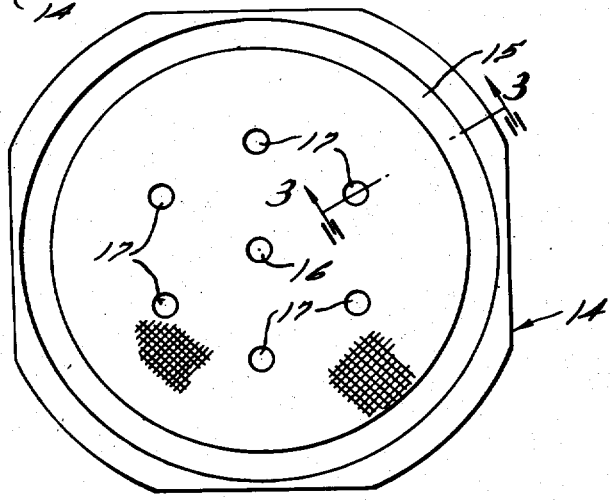
Fig. 2 is a plan view of our improved filter member.
Figure 3:
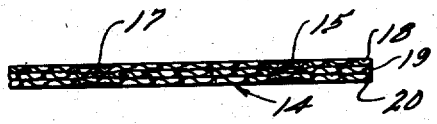
Fig. 3 is a transverse sectional view taken on the line 3—3 of Fig. 2.

The filter member 14 is made of sheets of plastic cloth or fabric molded together at predetermined points. There is shown in the drawings, having reference more particularly to Fig. 3, three layers or plies 18, 19 and 20 of plastic cloth, the outer edge portions thereof being fused together in a circular pattern at the location designated by the numeral 15 in order to rigidify the filter member structure at the locations were it is clampingly engaged between the end of the sleeve 41 and the crimped margin 42 of the casing 12. This fused ring also serves to fix the layers of plastic fiber together. Similarly, as shown in Fig. 2, the three plies of plastic cloth are fused together at locations 16 and 17, the former approximating the center of the plies, the latter locations 17 forming small dots dispersed generally around the center location 16. It may be readily seen that the layers or plies of the plastic cloth must be bonded together to prevent separation of the plies to assure maximum and uniformly consistent filtering action.

Figure 5:
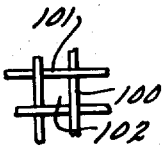
Fig. 5 is a fragmentary, enlarged view of the filament construction of the plastic cloth utilized in our invention.
Figure 6:
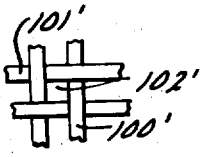
Fig. 6 is a fragmentary enlarged view, similar to Fig. 5 showing the plastic cloth after it has been pressed to predetermine its porosity.

Although various types of plastic materials may be used to form our improved plastic filter, the following synthetic resinous materials have been found very satisfactory: vinyl chloride and/or vinylidene chloride, vinyl chloride acetate, polyethylene and polytetrafluoroethylene. The filter may be constructed of multilayers of fabric woven from filaments extruded from the foregoing plastic and other plastic materials. The filaments of plastic material are generally circular in cross-section when the plies are made. However, due to the pliability of plastic material and its ability to take a permanent set after being subjected to heat and pressure, the plies may be press polished, hot rolled or calendered either before or after they are assembled to reduce the porosity thereof to a predetermined value. Although this step is not shown in the drawings, any conventional method may be used to exert pressure on the filaments to spread them out in the plane of the fabric and to thereby increase their effective filtering capacity. Fig. 5 is a magnified view of a plastic ply such as 18, 19 or 20 having vertical threads or filaments 100 and horizontal threads or filaments 101 with opening 102 between them. Fig. 5 represents the filaments as originally woven whereas Fig. 6 represents the filaments after they have been pressed by hot rolling, hot pressing, calendering or some other similar process. The size of the opening 102', as shown in Fig. 6, may be varied in accordance with the filter requirements desired. It may be seen that the effective filament dimensions will vary in accordance with the application for which the filter member is designed. For filtering dirt and water from gasoline, the following fabric construction has been found satisfactory:

Count=92 x 40 picked per inch;
Warp=.010 inch;
Fill=.010 inch;
Weight=16 oz. per sq. yard;
Weave=8 end twill.

As previously mentioned in this specification, the filaments 100, 101 which are woven to provide the filter plies 18, 19, 20 are each formed from plastic material by an extrusion process. From a consideration of Figs. 5 and 6, which are enlarged, magnified views of a fragmentary portion of one of the filter plies, it will be noted that the exterior surfaces of these filter ply filaments 100, 101 and 100', 101' are perfectly smooth. That is, they are not grooved or ribbed as would be the case if these individual filaments were formed by twisting together a plurality of separate filament strands. Due to the filaments 100, 101 and 100', 101' being perfectly smooth along their exterior surfaces there is no possibility of leakage of the filterable fluid through the filter ply by passage of the fluid through grooved depressions or channels formed on the filament exterior surfaces. Due to the plastic type of material used for the filaments, there is no fluid absorption by the filaments and thus all fluid passing through a filter formed in accordance with this invention passes through the relatively small openings 102' between the several filaments 100', 101'.

While it has been known that mono-filaments are stiffer than filaments formed by twisting together several thin filament strands, still, this does not present a problem in the construction of this particular filter cloth for it will be noted from Figs. 5 and 6, and from the description relating thereto, that the extruded filaments 100, 101 are woven so that the openings 102 (see Fig. 5) are initially larger than the final relatively small size openings 102' (see Fig. 6). However, after weaving of the filter ply from the single strand, smooth surfaced filaments 100, 101 as shown in Fig. 5, then the filter ply is rolled or pressed so as to deform the filaments 100, 101 to the flattened final form shown in Fig. 6. As a result of the method of fabrication of this filter ply, single strand, smooth surfaced filaments may be used to readily form a filter that will only permit fluid to pass therethrough by penetration of the openings between the filter strands, and will prevent fluid penetration through or lengthwise of the filaments.

In constructing the filter member 14, the fabric is first pressed as heretofore set forth to predetermine the size of the opening between the filaments and then three plies of the fabric, such as 18, 19 and 20 are piled one on top of the other, the warp direction of the center ply 19 being turned approximately 90° from the warp direction of the outside plies 18 and 20. The angle which the center ply is turned may vary with the type of filter action required by the filter member 14 and more than three plies may be used if the nature of the fluid to be filtered necessitates it. It should be noted, of course, that only two plies of the plastic cloth may be used, one warp direction being turned relative to the other, without departing from the scope of our invention. Similarly, a single ply of plastic fabric may be utilized as a filter by pressing the filaments of the fabric until the fabric has obtained a desired porosity and by fusing the filaments together at predetermined locations to form a sealing surface on the ply for cooperation with the filter holder.

Figure 4:
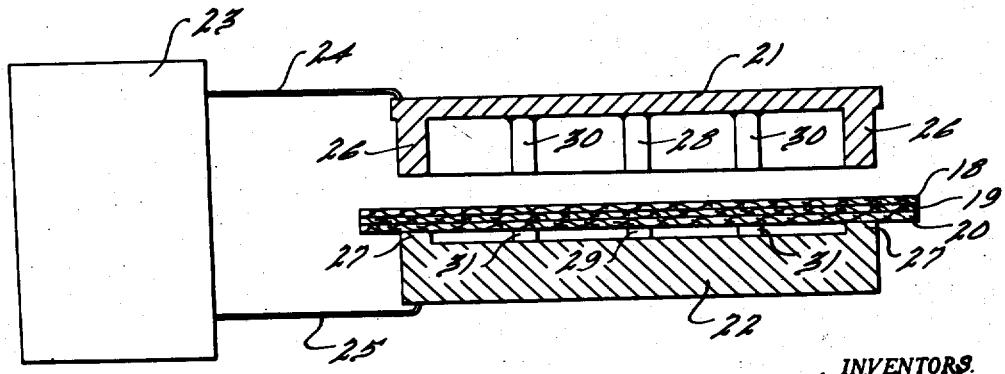
Fig. 4 is an elevational view partly in section illustrating a process for bonding together the resinous fabric layers of the improved filter member.

In Fig. 4, of the drawing, is illustrated a dielectric process for simultaneously fusing together the marginal portions 15 of the plastic fabric ply as well as the areas 16 and 17 thereof. This is accomplished by placing the plies of plastic material between two dielectric sealing platters 21 and 22 and fusing them together preferably under pressure by dielectric heating as shown in Fig. 4, it being understood that the platter 21 is brought into engagement with the upper ply of the stack. A typical design of the apparatus used for performing the dielectric heating is shown in Fig. 4 wherein 23 indicates an electronic oscillator connected by wires 24 and 25 to the platters 21 and 22, respectively. The platter 21 is provided with an integral ring portion 26 which cooperates with a ring portion 27 on the platter 22 to form the fused ring at the location 15 on the filter member 14. The platter 21 is also provided with a cylindrical projection 28 which cooperates with a cylindrical projection 29 on the platter 22 for providing the fused dot at the location 16 on the filter. Similarly, the platter 21 is provided with a plurality of projections 30 which cooperate with projections 31 on the platter 22 by forming the fused dots indicated at 17 on the filter member 14. It may be readily seen that once the dielectric heating is finished, the three plies of plastic cloth will be fused together as more clearly shown in Fig. 3. The operating values of the oscillator 23 may be varied in accordance with desired results but at frequency of 17 megacycles at 1400 volts at a time of 36 seconds has been found to be very satisfactory in the making of a filter for use in a gasoline tank. By employing dielectric heating in fusing together the plies and forming the fused ring 15, it is not necessary to rely upon conduction or convection of heat from the exterior to the interior of the assembly for dielectric heating uniformly simultaneously and directly all the selected portions of the assembly throughout its thickness. It is therefore not necessary to apply excessive heat on the outer plies in order to heat the inner plies at the selected locations.

The plastic fabric formed of a plurality of plies of plastic cloth as herein disclosed may be of any desired shape and if desired, the plastic material on the outside of the fused ring at 15 may be trimmed from the filter member 14. It should be noted, however, that a circular ring as at 15 has been shown herein for illustrative purposes only and any fused design may be used without departing from the scope of this invention.

It has been found that this improved filter is non-catalytic to gum forming gasolines. The materials proposed are resistant to the action of aromatic fuels and the aliphatics, methyl and ethyl alcohol, and any other chemical compounds and solvents with which gasoline may ordinarily be found to be contaminated. This filter will successfully remove dirt or foreign particles of any size as well as thread, lint or other filaments commonly found in fuel systems and it will also separate gasoline from a mixture of gasoline and water.

By using the method of bonding as herein disclosed, the porosity of only a small portion of the filter is affected. Due to the flexibility of the filter member 14, it is self-cleaning because when the surface becomes clogged with dust, mud, or other deposit, the differential pressure across the filter will increase and the filter member will flex due to the suction of the pump. The foreign material will be dislodged and prevent the formation of an obstructing caked deposit on the filter member.

The filaments or threads from which the plastic fabric is woven may comprise thermosetting resins such as phenol formaldehyde resin, urea formaldehyde resin, and other thermosetting compounds. In this case, however, it is preferable to weave the fabric while the plastic filaments are in semi-cured state and fuse the plies together at the areas indicated at 15, 16 and 17 in the foregoing manner by dielectric heat and pressure. The remaining portions of the plies may remain in their semi-cured state or may be finally cured subsequently in an oven.

Although dielectric heating is the only method shown and described, it should be borne in mind that other methods such as sewing, clipping, stapling, or clamping may be used to maintain the plies of fabric in an assembled relationship without departing from the spirit of our invention.

While we have illustrated and described but one embodiment of our invention, it is to be understood that such is for the purpose of illustration only, and it is contemplated that those skilled in the art may modify certain details without departing from the scope of the invention as defined in the claims appended hereto.

We claim:

*1.* A filter element adapted to be mounted in an encircling support comprising a plurality of superimposed plastic plies woven from extruded filaments of synthetic resinous material, each ply comprising interwoven warp and fill threads which are each smooth surfaced, filaments that are initially loosely interwoven to provide relatively large openings between the threads and subsequently compressed and spread out throughout their lengths to provide relatively small filtering openings between the threads suitable for the separation of liquids of differing physical properties, said plies having the warp direction of one ply at an angle to the warp direction of an adjacent ply with said superimposed plies being adhered together at the center of their filter area and at a plurality of other points located at spaced intervals throughout the filter area of the element.

*2. A filter element adapted to be mounted in a support comprising a plurality of superimposed plastic plies woven from extruded filaments of synthetic resinous material, each ply comprising interwoven warp and fill threads which are each smooth surfaced filaments that are initially loosely interwoven to provide relatively large openings between the threads and subsequently compressed and spread out throughout their lengths to provide relatively small filtering openings between the threads suitable for the separation of liquids of differing physical properties, said plies having the warp direction of one ply at an angle to the warp direction of an adjacent ply with said superimposed plies being adhered together at a plurality of points located at spaced intervals throughout the filter area of the element.*

References Cited in the file of this patent or the original patent

UNITED STATES PATENTS

| | | |
|---|---|---|
| 789,062 | Prescott | May 2, 1905 |
| 1,062,532 | Blair | May 20, 1913 |
| 2,297,729 | Thomas | Oct. 6, 1942 |
| 2,324,838 | Harz et al. | July 20, 1943 |
| 2,333,618 | Strauss | Nov. 2, 1943 |
| 2,354,714 | Strickland | Aug. 1, 1944 |
| 2,355,822 | Rugeley et al. | Aug. 15, 1944 |
| 2,423,547 | Behlen | July 8, 1947 |
| 2,425,388 | Oestricker | Aug. 12, 1947 |
| 2,521,984 | Lange | Sept. 12, 1950 |
| 2,551,175 | Smith | May 1, 1951 |
| 2,556,722 | Hersberger et al. | June 12, 1951 |
| 2,711,828 | Webb et al. | June 28, 1955 |

FOREIGN PATENTS

| | | |
|---|---|---|
| 38,266 | Sweden | Feb. 3, 1915 |
| 321,814 | Germany | June 15, 1920 |
| 476,372 | Great Britain | Dec. 7, 1937 |
| 491,218 | Great Britain | Aug. 26, 1938 |